(12) United States Patent
Ueda

(10) Patent No.: US 9,950,534 B2
(45) Date of Patent: Apr. 24, 2018

(54) DAMPER DEVICE, LIQUID SUPPLY SYSTEM INCLUDING THE SAME, AND INKJET RECORDING DEVICE

(71) Applicant: Roland DG Corporation, Hamamatsu-shi, Shizuoka (JP)

(72) Inventor: Naoki Ueda, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/393,304

(22) Filed: Dec. 29, 2016

(65) Prior Publication Data

US 2017/0106657 A1    Apr. 20, 2017

Related U.S. Application Data

(63) Continuation of application No. 15/248,232, filed on Aug. 26, 2016, now Pat. No. 9,757,948.

(30) Foreign Application Priority Data

Aug. 28, 2015   (JP) ................................ 2015-169132

(51) Int. Cl.
B41J 2/175      (2006.01)
F16L 55/05      (2006.01)

(52) U.S. Cl.
CPC ............... *B41J 2/175* (2013.01); *F16L 55/05* (2013.01)

(58) Field of Classification Search
CPC combination set(s) only.
See application file for complete search history.

(56) References Cited

U.S. PATENT DOCUMENTS 5,030,973 A * 7/1991 Nonoyama ............... B41J 2/055
                                                   347/93
6,485,137 B2 * 11/2002 Karlinski ................. B41J 2/175
                                                   347/85

(Continued)

FOREIGN PATENT DOCUMENTS

WO    WO 2015174535 A1 *  11/2015 .............. B41J 2/175

OTHER PUBLICATIONS

Ueda, "Damper Device, Liquid Supply System Including the Same, and Inkjet Recording Device", U.S. Appl. No. 15/248,232, filed Aug. 26, 2016.

*Primary Examiner* — Matthew Luu
*Assistant Examiner* — Lily Kemathe
(74) *Attorney, Agent, or Firm* — Keating & Bennett, LLP

(57) ABSTRACT

A damper device includes a hollow case main body provided with an opening, a pressure sensitive film attached to the case main body so as to cover the opening, demarcates a liquid storage chamber together with the case main body, and is flexibly deformable internally toward, or externally away from, the liquid storage chamber, an inlet that is in the case main body, is in communication with the liquid storage chamber, and allows the liquid to flow into the liquid storage chamber, an injection outlet that is in the case main body, is in communication with the liquid storage chamber, and allows the liquid to flow out toward the liquid injector, an elastic member coupled with the pressure sensitive film to flexibly deform the pressure sensitive film externally away from the liquid storage chamber, and a pressure receiving plate that is located between the pressure sensitive film and the elastic member and includes a discontinuously joined portion that is discontinuously joined with the pressure sensitive film.

6 Claims, 6 Drawing Sheets

(56) References Cited

U.S. PATENT DOCUMENTS

| | | | | |
|---|---|---|---|---|
| 7,540,598 B2* | 6/2009 | Hori | ............ | B41J 2/17513 347/86 |
| 7,922,311 B2* | 4/2011 | Chikamoto | ............ | B29C 65/606 347/65 |
| 8,366,227 B2* | 2/2013 | Ogura | ............ | B41J 2/175 347/14 |
| 8,480,213 B2* | 7/2013 | Akiyama | ............ | B41J 2/17509 347/85 |
| 8,544,982 B2* | 10/2013 | Sakata | ............ | B41J 2/14209 347/22 |
| 8,556,395 B2* | 10/2013 | Hiratsuka | ............ | B41J 2/16526 347/85 |
| 8,662,610 B2* | 3/2014 | Saga | ............ | B41J 2/17513 347/19 |
| 8,814,294 B2* | 8/2014 | Shibata | ............ | B41J 2/175 347/17 |
| 2002/0047882 A1* | 4/2002 | Karlinski | ............ | B41J 2/175 347/85 |
| 2007/0109362 A1* | 5/2007 | Hori | ............ | B41J 2/17513 347/65 |
| 2010/0245481 A1* | 9/2010 | Okubo | ............ | B41J 2/055 347/50 |
| 2011/0205315 A1* | 8/2011 | Saga | ............ | B41J 2/17513 347/85 |
| 2011/0273512 A1* | 11/2011 | Murase | ............ | B41J 2/14209 347/38 |
| 2013/0002772 A1* | 1/2013 | Hiratsuka | ............ | B41J 2/16526 347/85 |
| 2017/0087868 A1* | 3/2017 | Miyashita | ............ | B41J 2/17596 |

* cited by examiner

DAMPER DEVICE, LIQUID SUPPLY SYSTEM INCLUDING THE SAME, AND INKJET RECORDING DEVICE

CROSS REFERENCE TO RELATED APPLICATIONS

The present application claims priority to Japanese Patent Application No. 2015-169132 filed on Aug. 28, 2015, which is incorporated by reference herein in its entirety.

BACKGROUND OF THE INVENTION

1. Field of the Invention

The present invention relates to a damper device located on a liquid supply path connecting a liquid supply that supplies a liquid and a liquid injector that injects the liquid, and relates to a liquid supply system including such a damper device, and an inkjet recording device.

2. Description of the Related Art

An inkjet recording device for industrial use or the like adopts a structure in which a large capacity ink cartridge is located away from a carriage having an ink injection head mounted thereon, namely, an off-carriage system. In a recording device of the off-carriage system, a large dynamic pressure fluctuation is generated by a movement of a carriage. If the large dynamic pressure fluctuation is applied to the ink injection head, ink injection may be destabilized or ink may be unexpectedly dropped from the injection head to stain the printed item.

In such a situation, it has been conventionally studied to suppress the ink pressure fluctuation in the ink injection head. For example, Japanese Laid-Open Patent Publication No. 2005-059274 discloses a structure in which an ink injection head and a damper device are mounted on a carriage.

The damper device described in Japanese Laid-Open Patent Publication No. 2005-059274 includes a case main body forming an ink storage chamber, a flexible pressure sensitive film acting as one surface of the ink storage chamber, and an elastic member urging the pressure sensitive film externally away from the ink storage chamber. At substantially the center of the pressure sensitive film, a reinforcing member is bonded. In this damper device, ink is supplied at a predetermined pressure to the ink injection head based on a flexible deformation of the pressure sensitive film.

However, in the damper device described in Japanese Laid-Open Patent Publication No. 2005-059274, in the case where, for example, the reinforcing member is bonded to the pressure sensitive film in a certain manner, the pressure sensitive film may not be flexibly deformed in a proper manner and thus the ink may be supplied unstably. In the case where, for example, substantially the entire surface of the reinforcing member is bonded to the pressure sensitive film, the movable area of the pressure sensitive film may be narrowed. In the case where air is confined at a bonding surface when the reinforcing member is bonded to the pressure sensitive film, the air may act as a resistance and as a result, the pressure sensitive film may be flexibly deformed irregularly.

SUMMARY OF THE INVENTION

Preferred embodiments of the present invention provide damper devices that transmit a pressure fluctuation in a liquid storage chamber to a photosensitive film with high precision and thus supply a liquid to the a liquid injector stably and reliably. Other preferred embodiments of the present invention provide liquid supply systems including the damper devices, and inkjet recording devices.

A damper device according to a preferred embodiment of the present invention is located on a liquid supply path usable to supply a liquid from a liquid supply to a liquid injector. The damper device is located on the liquid supply path connecting the liquid supply supplying the liquid and the liquid injector injecting the liquid to each other. The damper device includes a hollow case main body provided with an opening; a pressure sensitive film that is attached to the case main body so as to cover the opening, demarcates a liquid storage chamber together with the case main body, and is flexibly deformable internally toward, or externally away from, the liquid storage chamber; an inlet that is provided in the case main body, in communication with the liquid storage chamber, and allows the liquid to flow into the liquid storage chamber; an injection outlet that is provided in the case main body, is in communication with the liquid storage chamber, and allows the liquid to flow out toward the liquid injector; an elastic member coupled with the pressure sensitive film so as to flexibly deform the pressure sensitive film externally away from the liquid storage chamber; and a pressure receiving plate that is located between the pressure sensitive film and the elastic member and includes a discontinuously joined portion that is discontinuously joined with the pressure sensitive film.

In the above-described damper device, the pressure sensitive film and the pressure receiving plate are joined discontinuously. Therefore, in contrast to a case where the pressure sensitive film and the pressure receiving plate are joined together along the entire surface thereof, the movable area of the pressure sensitive film is not easily restricted. In addition, air is not easily confined at the joining surface of the pressure sensitive film and the pressure receiving plate. Therefore, the above-described damper device allows the pressure sensitive film to be flexibly deformed so as to better reflect the pressure fluctuation in the liquid storage chamber. As a result, the liquid is supplied to the liquid injector stably.

In another preferred embodiment of the present invention, a liquid supply system is provided. The liquid supply system includes a liquid supply that supplies a liquid; a liquid injector that injects the liquid; a liquid supply path that communicates the liquid supply and the liquid injector to each other; and the above-described damper device located on the liquid supply path to supply the liquid to the liquid injector.

In still another preferred embodiment of the present invention, an inkjet recording device including the above-described liquid supply system is provided.

The damper devices according to various preferred embodiments of the present invention allow the pressure sensitive film to be flexibly deformed so as to better reflect the pressure fluctuation in the liquid storage chamber. Therefore, the liquid supply systems including the damper devices according to preferred embodiments of the present invention supply the liquid to the ink injection unit stably and inject the liquid from the liquid injector stably.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, damper devices, liquid supply systems, and inkjet recording devices according to preferred embodiments of the present invention will be described with reference to the drawings. The preferred embodiments described herein do not limit the present invention. Elements or features having the same function will be assigned the same reference signs, and repetitive descriptions will be omitted or simplified.

Figure 1:
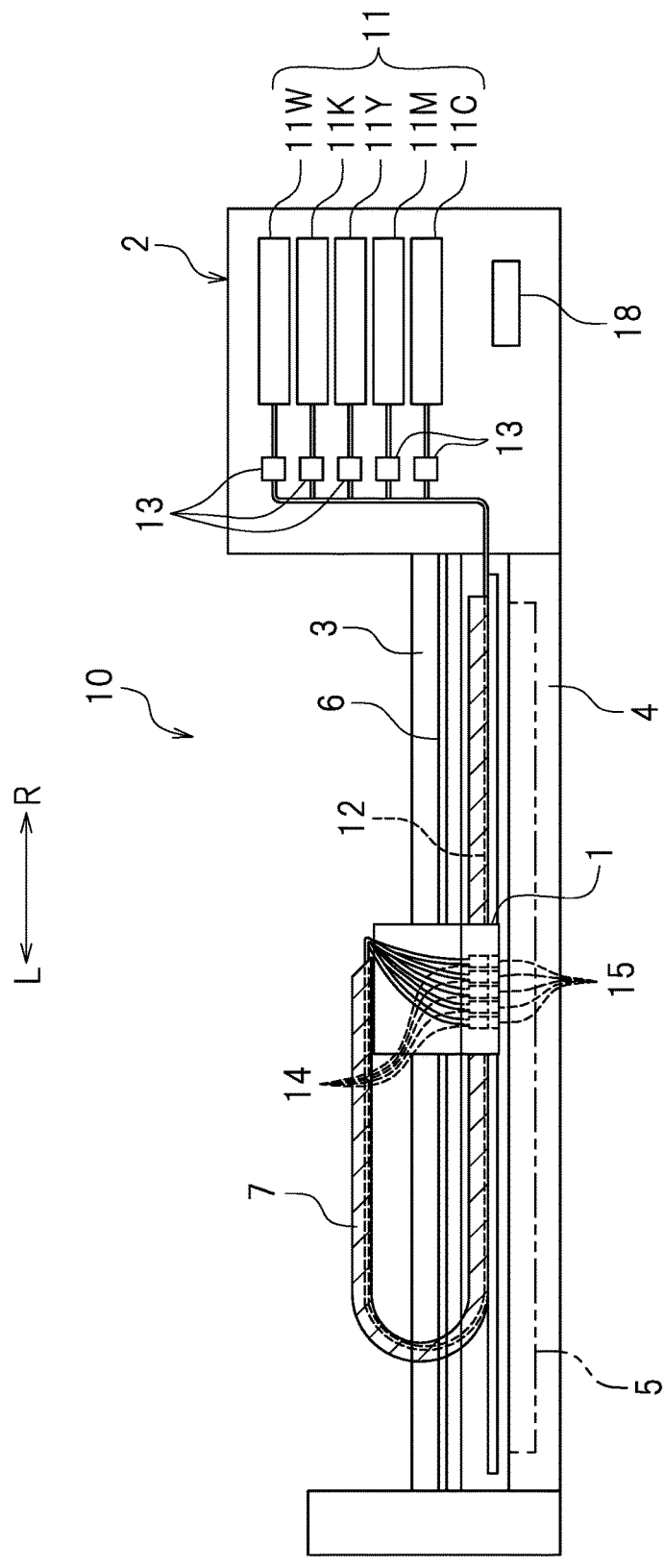
FIG. 1 is a front view of an inkjet printer according to a preferred embodiment of the present invention.

FIG. 1 is a front view of an inkjet printer (hereinafter, referred to as a "printer") 10 according to a preferred embodiment of the present invention. In FIG. 1 and the like, reference signs L and R respectively refer to "left" and "right". In FIG. 1, the closer side to, and the farther side from, the viewer of FIG. 1 are respectively the front side and the rear side. It should be noted that these directions are merely provided for the sake of convenience, and do not limit the manner of installation of the printer 10 in any way.

The printer 10 is an example of an inkjet recording device. The printer 10 performs printing on a recording paper sheet 5, which is a recording medium. The "recording medium" encompasses paper such as plain paper or the like, and also a recording medium formed of a resin material such as polyvinyl chloride (PVC), polyester or the like and a recording medium formed of any of various other materials such as aluminum, iron, wood or the like.

The printer 10 includes a printer main body 2, and a guide rail 3 secured to the printer main body 2. The guide rail 3 extends in a left-right direction. The guide rail 3 is engaged with a carriage 1. The guide rail 3 is provided with a roller (not shown) at each of a left end and a right end thereof. One roller among these rollers is coupled with a carriage motor (not shown). The one roller is drivable to rotate by the carriage motor. Both of the rollers are each wound around by an endless belt 6. The carriage 1 is secured to the belt 6. When the rollers rotate and the belt 6 moves, the carriage 1 moves in the left-right direction. In this manner, the carriage 1 moves reciprocally in the left-right direction along the guide rail 3.

The printer main body 2 includes a platen 4 supporting the recording paper sheet 5. The platen 4 is provided with a pair of rollers, namely, an upper grid roller and a lower pinch roller (not shown). The grid roller is coupled with a field motor (not shown). The grid roller is drivable to rotate by the field motor. When the grid roller rotates in the state where the recording paper sheet 5 is held between the grid roller and the pinch roller, the recording paper sheet 5 is transported in a front-rear direction.

The printer main body 2 is provided with an ink cartridge 11. The ink cartridge 11 is a tank (liquid supply) storing ink. In the preferred embodiment shown in FIG. 1, a plurality of the ink cartridges 11C, 11M, 11Y, 11K and 11W are detachably attached to the printer main body 2. The ink cartridge 11C stores cyan ink. The ink cartridge 11M stores magenta ink. The ink cartridge 11Y stores yellow ink. The ink cartridge 11K stores black ink. The ink cartridge 11W stores white ink. The ink cartridges 11C, 11M, 11Y, 11K and 11W each include an ink removal outlet (not shown) attached thereto.

The printer 10 includes an ink supply system for each of the ink cartridges 11C, 11M, 11Y, 11K and 11W of the respective colors. The ink supply system shown in FIG. 1 includes an ink supply path 12, a liquid transmission pump 13, a damper device 14, an ink injection head 15, and a controller 18. The damper device 14 and the ink ejection head 15 are mounted on the carriage 1 and reciprocally move in the left-right direction. By contrast, the ink cartridges 11 are not mounted on the carriage 1 and do not reciprocally move in the left-right direction. A majority of the ink supply path 12 (at least half of the total length thereof) extends in the left-right direction so as not to be broken even when the carriage 1 moves in the left-right direction. In this preferred embodiment, five types of ink are preferably used, for example, and therefore, a total of five ink supply paths 12 are provided. The ink supply paths 12 are covered with a cable protection and guide device 7. The cable protection and guide device 7 is, for example, a cableveyor (registered trademark).

Figure 2:
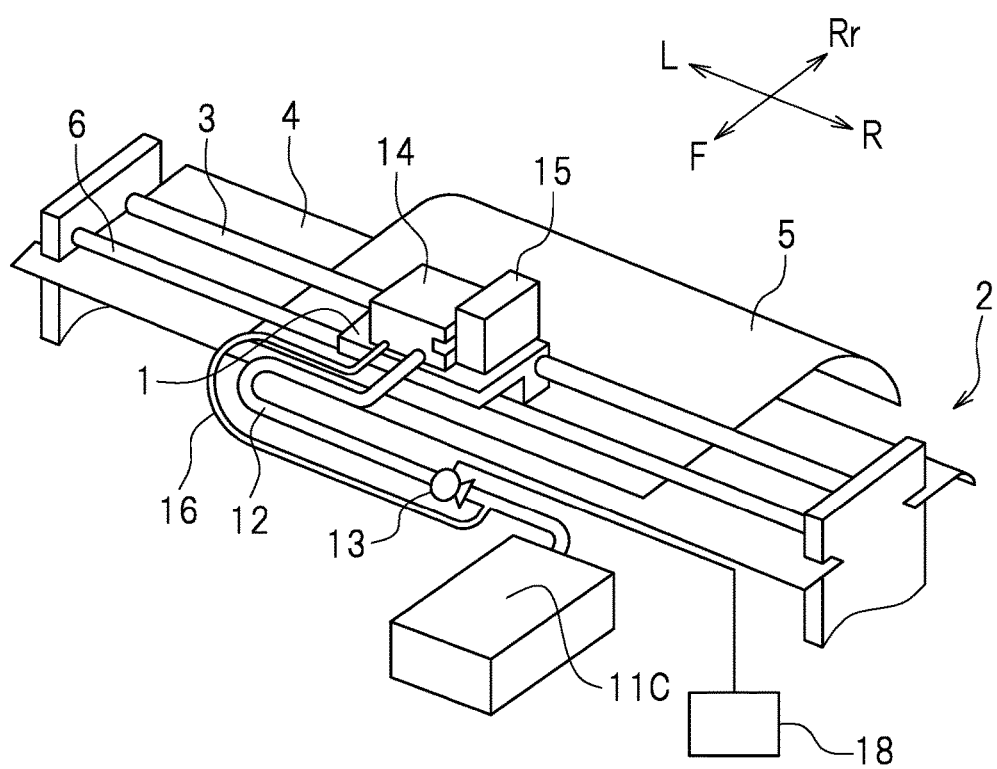
FIG. 2 is a partial perspective view of the inkjet printer shown in FIG. 1.
Figure 3:
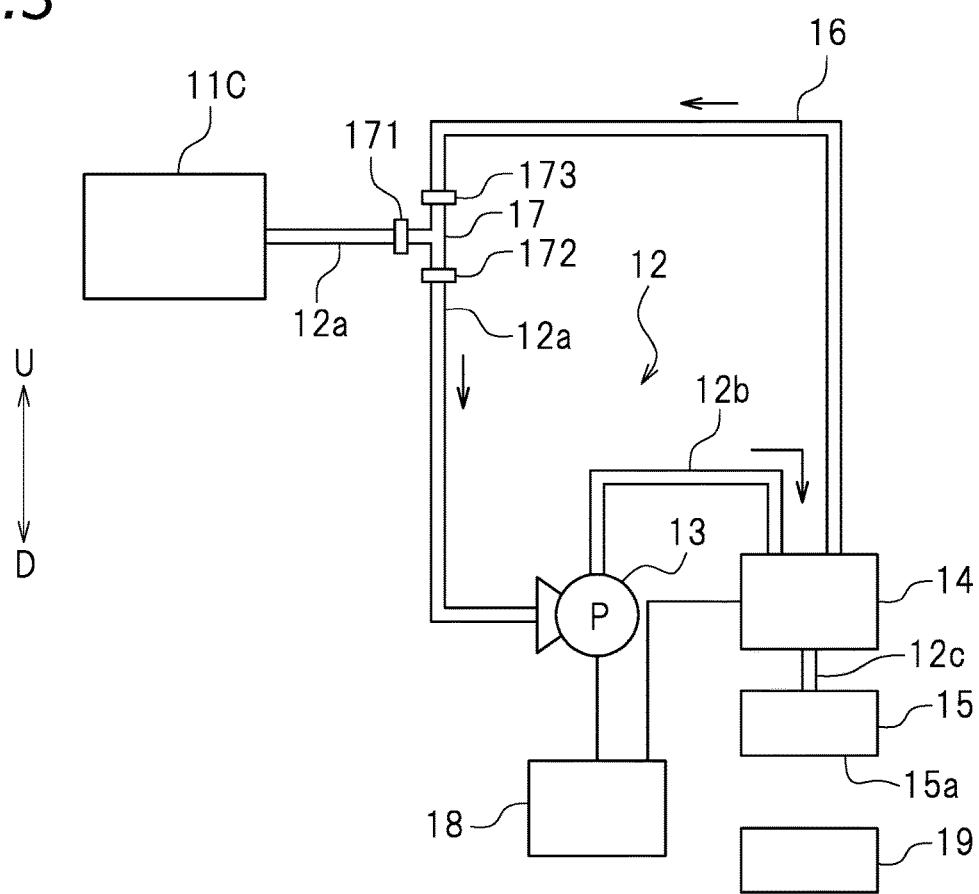
FIG. 3 is a block diagram showing a structure, of the inkjet printer shown in FIG. 1, in which ink is supplied from an ink cartridge to an ink injection head.

In the following description, the ink supply system provided for the ink cartridge 11C storing cyan ink will be explained as an example. FIG. 2 is a partial perspective view of the printer 10. FIG. 3 is a schematic view showing a structure in which the ink is supplied from the ink cartridge 11C to the ink injection head 15. In FIG. 2, reference signs F and Rr respectively refer to "front" and "rear". In FIG. 3 and the like, reference signs U and D respectively refer to "up" and "down" regarding the direction of gravity.

The ink supply system shown in FIG. 2 and FIG. 3 includes the ink cartridge (liquid supply) 11C, the ink supply path (liquid supply path) 12, the transmission pump 13, the damper device 14, the ink injection head (liquid injection head) 15, an ink circulation path 16, and the controller 18.

The ink supply path 12 is an ink flow path that guides the ink from the ink cartridge 11C to the ink injection head 15. The ink supply path 12 is soft and flexible so as to follow the movement of the carriage 1. The ink supply path 12 is, for example, a deformable tube formed of a resin. The ink supply path 12 may be a member other than a tube. In the preferred embodiment shown in FIG. 3, the ink supply path 12 includes tube portions 12a, 12b and 12c. The tube portion 12a communicates the ink cartridge 11C and the liquid transmission pump 13 to each other. The tube portion 12b communicates the liquid transmission pump 13 and the damper device 14 to each other. The tube portion 12c communicates the damper device 14 and the ink injection head 15 to each other. The ink is supplied from the ink cartridge 11C to the ink injection head 15 in such a route.

The liquid transmission pump 13 is an example of a liquid transmission device that supplies the ink from the ink cartridge 11C toward the ink injection head 15. The liquid transmission pump 13 is provided on the ink supply path 12. There is no specific limitation on the type of the liquid transmission pump 13. The liquid transmission pump 13 is a tube pump of, for example, a trochoid pump system. The liquid transmission pump 13 is connected with the controller 18. The liquid transmission pump 13 is controlled to be driven or stopped by the controller 18.

The ink injection head 15 is an example of an injection device that injects the ink toward the recording paper sheet 5. On a lower surface 15a of the ink injection head 15, a plurality of nozzles (not shown) through which the ink is to be injected are provided. Inside the ink injection head 15, an actuator (not shown) including a piezoelectric element or the like is provided. The actuator is driven to inject the ink from the nozzles. In the preferred embodiment shown in FIG. 3, the lower surface 15a of the ink injection head 15 is provided at a position lower than that of the ink cartridge 11C. It should be noted that the lower surface 15a of the ink injection head 15 may be provided at a position located at the same or substantially the same height as that of the ink cartridge 11C. The lower surface 15a of the ink injection head 15 may be provided at a position higher than that of the ink cartridge 11C.

The ink circulation path 16 is an ink flow path that returns the ink from the damper device 14 toward the tube portion 12a. An end of the ink circulation path 16 is connected with the damper device 14. The other end of the ink circulation path 16 is connected with a portion of the ink supply path 12 that is between the ink cartridge 11C and the liquid transmission pump 13, namely, the tube portion 12a. At a position at which the ink circulation path 16 and the tube portion 12a are in communication with each other, a three-way valve 17 is located. The ink circulation path 16 is preferably made of, for example, a material that is the same or substantially the same as that of the ink supply path 12.

The three-way valve 17 includes a first connection opening 171 connected with the tube portion 12a and communicable with the ink cartridge 11C, a second connection opening 172 connected with the tube portion 12a and communicable with the liquid transmission pump 13, and a third connection opening 173 that is connected with the ink circulation path 16 and communicates the damper device 14 and the tube portion 12a to each other. There is no specific limitation on the type of the three-way valve 17. The three-way valve 17 is, for example, an electromagnetic valve. The three-way valve 17 is connected with the controller 18. The three connection openings 171, 172 and 173 are switched into a communication state or non-communication state by the controller 18.

The controller 18 is configured or programmed to control ink supply from the ink cartridge 11C to the ink injection head 15. The controller 18 is connected with the liquid transmission pump 13, the damper device 14 and the three-way valve 17. The controller 18 is configured or programmed to control the liquid transmission pump 13 to be driven or stopped. The controller 18 drives the liquid transmission pump 13 when, for example, the amount of the ink stored in the damper device 14 reaches a predetermined lower limit. The controller 18 stops the liquid transmission pump 13 when, for example, the amount of the ink stored in the damper device 14 reaches a predetermined upper limit (when the damper device 14 becomes full). The controller 18 also switches the three-way valve 17 to be opened or closed. In this manner, the ink is circulated in the ink supply system. The controller 18 is preferably a computer. The controller 18 may include a central processing unit (CPU) and a ROM or a RAM storing a program or the like to be executed by the CPU.

The damper device 14 is in communication with the ink injection head 15 and supplements the ink supplied to the ink injection head 15. The damper device 14 also alleviates the pressure fluctuation of the ink to stabilize the ink injection operation of the ink injection head 15. The damper device 14 is provided on the ink supply path 12. In this preferred embodiment, the damper device 14 is provided close to the ink injection head 15. This allows the dynamic pressure fluctuation of the ink to be absorbed immediately before the ink is injected, and thus further increases the stability of the ink injection operation.

Figure 4:
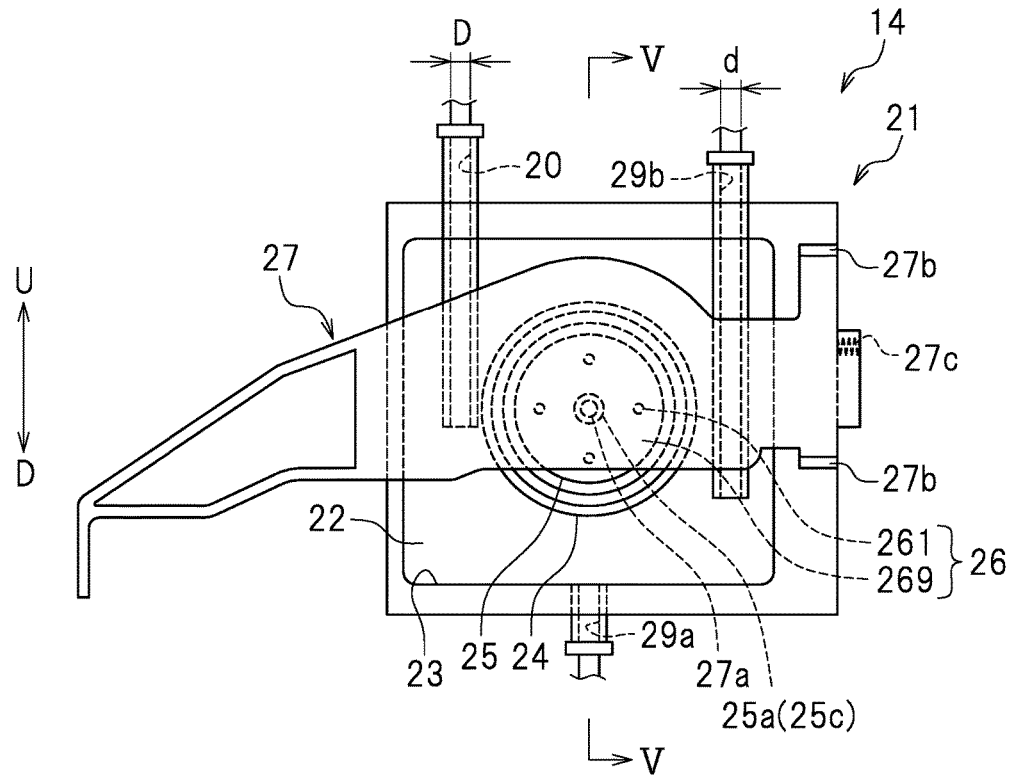
FIG. 4 is a side view of a damper device according to a preferred embodiment of the present invention.
Figure 5:
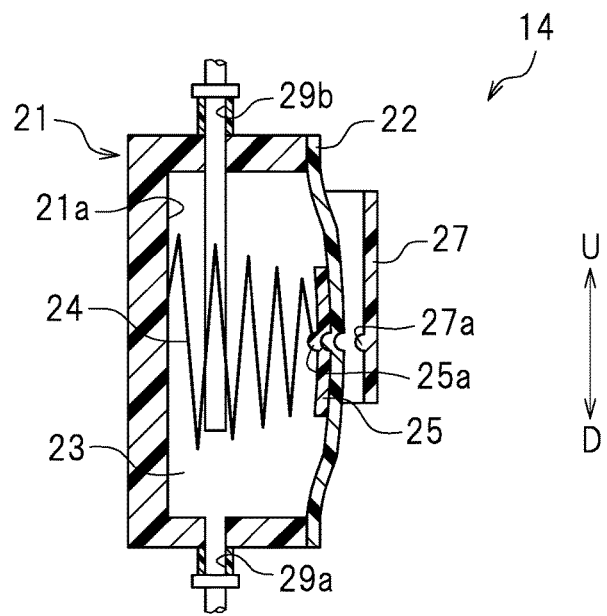
FIG. 5 is a vertical cross-sectional view of the damper device shown in FIG. 4 taken along line V-V in FIG. 4.

FIG. 4 is a side view of the damper device 14 according to a preferred embodiment of the present invention. FIG. 5 is a vertical cross-sectional view of the damper device 14 shown in FIG. 4 taken along line V-V in FIG. 4. As shown in FIG. 5, the damper device 14 includes a hollow case main body 21 provided with an opening at one surface (right surface in FIG. 5) and a damper film 22 provided on an outer wall of the case main body 21 so as to cover the opening. The case main body 21 is preferably made of a resin, for example. An area enclosed by the case main body 21 and the damper film 22 is an ink storage chamber 23. On the side of the damper film 22 opposite to the ink storage chamber 23, a detection lever 27 is located. The damper device 14 in this preferred embodiment does not have a valve structure.

As shown in FIG. 4, an ink inlet 20, through which the ink flows into the damper device 14, is provided at a wall (e.g., the upper wall in FIG. 4) of the case main body 21. The ink inlet 20 is connected with the tube portion 12b and is in communication with the ink cartridge 11C. An ink injection outlet 29a, through which the ink flows out of the damper device 14, is provided at another wall (e.g., the lower wall in FIG. 4) of the case main body 21. The ink injection outlet 29a is connected with the tube portion 12c and is in communication with the ink injection head 15. An ink circulation outlet 29b is provided at the wall (e.g., the upper wall in FIG. 4) of the case main body 21. The ink circulation outlet 29b is connected with the ink circulation path 16 and is communicable with the tube portion 12a via the three-way tube 17. The ink inlet 20, the ink injection outlet 29a and the ink circulation outlet 29b are each in communication with the ink storage chamber 23. In this preferred embodiment, the ink storage chamber 23 preferably is parallelepiped or substantially parallelepiped, for example. A predetermined amount of the ink is temporarily stored in the ink storage chamber 23.

In this preferred embodiment, a tip (lower end) of the ink circulation outlet 29b is located below a tip (lower end) of the ink inlet 20 in the direction of gravity. In this preferred embodiment, the tip of the ink inlet 20 is located at a position higher than a lower surface of the ink storage chamber 23 by about ½ of the depth of the ink storage chamber 23, for example. The tip of the ink circulation outlet 29b is located at a position higher than the lower surface of the ink storage chamber 23 by about ¼ of the depth of the ink storage chamber 23, for example. The ink circulation outlet 29b has an inner diameter d smaller than an inner diameter D of the ink inlet 20; namely, d<D.

The damper film 22 is attached to an edge of the case main body 21 by, for example, heat welding at such a tensile strength as to be flexibly deformable internally toward, or externally away from, the ink storage chamber 23. The damper film 22 is an example of a pressure sensitive film, and is flexibly deformable in accordance with the pressure in the ink storage chamber 23. The damper film 22 is preferably a flexible film made of a resin, for example. The damper film 22 may have a single-layer structure or a multi-layer structure including films of different materials that are stacked and integrated. A surface of the damper film 22 on the side of the ink storage chamber 23 may be, for example, coated for the purpose of improving the ink corrosion resistance.

As shown in FIG. 5, inside the ink storage chamber 23, an end of a tapered spring 24 is attached to a surface 21a of the case main body 21, the surface 21a facing the damper film 22. The other end of the tapered spring 24 is connected with a pressure receiving plate 25. The tapered spring 24 is coupled with the damper film 22. The tapered spring 24 is an example of an elastic member that presses the damper film 22 externally away from the ink storage chamber 23. The tapered spring 24 is maintained in a compressed state. With such a structure, the damper film 22 is pressed externally away from the ink storage chamber 23 (rightward in FIG. 5) and thus is flexibly deformed. When the amount of the ink stored in the ink storage chamber 23 is decreased to a predetermined level and as a result, the pressure in the ink storage chamber 23 is decreased by a certain degree, the damper film 22 is flexibly deformed internally toward the ink storage chamber 23 against the spring force (elasticity) of the tapered spring 24.

The tapered spring 24 is conical in an uncompressed state and has an inner diameter that gradually varies in a height direction of the conical shape. The tapered spring 24 is contracted in the height direction when being compressed, and becomes like a flat or substantially flat plate when being completely compressed. In this preferred embodiment, the tapered spring 24 is located such that the inner diameter thereof becomes smaller the closer it is to the damper film 22 away from the wall 21a of the case main body 21. There is no specific limitation on the material of the tapered spring 24. The tapered spring 24 may be, for example, coated for the purpose of improving the ink corrosion resistance.

Inside the ink storage chamber 23, the pressure receiving plate 25 is located between the damper film 22 and the tapered spring 24. The pressure receiving plate 25 is located at or substantially at the center of the damper film 22 so as to press the damper film 22 uniformly or substantially uniformly externally away from the ink storage chamber 23. In this preferred embodiment, the pressure receiving plate 25 preferably is circular or substantially circular, for example. The pressure receiving plate 25 may be preferably made of a material selected in consideration of the ease of joining with the damper film 22. The pressure receiving plate 25 may be preferably made of a material harder than that of the damper film 22. The pressure receiving plate 25 may be preferably relatively lightweight so as not to inhibit the flexible deformation of the damper film 22. In this preferred embodiment, the pressure receiving plate 25 is preferably made of a polyacetal-based resin, for example.

In this preferred embodiment, a surface of the pressure receiving plate 25 facing the damper film 22 preferably has a size that is about 10% or greater, preferably about 10% to about 30%, or about 15% to about 20%, of a total size of the damper film 22 covering the opening of the case main body 21, for example. In the case where the surface of the pressure receiving plate 25 is thus large, the damper film 22 is uniformly or substantially uniformly pressed externally away from the ink storage chamber 23. In addition, the flexible deformation of the damper film 22 is transmitted to the pressure receiving plate 25 with high precision. In contrast, in the case where the pressure receiving plate 25 having a large size is bonded to the damper film 22, the movable area of the damper film 22 may be significantly restricted. In order to avoid this, with the technology disclosed herein, the pressure receiving plate 25 and the damper film 22 are joined together discontinuously, not along the entire surface thereof. With such a structure, the pressure receiving area of the pressure receiving plate 25 is made large while the movable area of the damper film 22 is maintained. As a result, the damper film 22 is flexibly deformed smoothly in accordance with the fluctuation in the amount of the ink. Herein, the expression "discontinuous" or "discontinuous joining" refers to a structure in which the pressure receiving plate 25 and the damper film 22 are not joined together along the entire surface or circumference or periphery thereof, but a portion of the pressure receiving plate 25 is left unjoined with the damper film 22 intentionally to achieve unique advantages described herein. Because the pressure receiving plate 25 and the damper film 22 are joined together discontinuously, the pressure receiving plate 25 and the damper film 22 are joined together preferably at spaced apart joined portions or connection portions along a periphery or a concentric circle.

A discontinuously joined portion 26 of the pressure receiving plate 25 includes one or a plurality of joined portions 261 joined with the damper film 22 and one or a plurality of non-joined portions 269 not joined with the damper film 22. It is preferable that at least one or more of the non-joined portions 269 are closer to the center of the pressure receiving plate 25 than one or more of the joined portions 261 closest to an edge of the pressure receiving plate 25. It is preferable that the non-joined portion 269 is not closed or surrounded by the joined portions 261. Namely, it is preferable that the non-joined portion 269 is open such that air bubbles are not easily stored in the discontinuously joined portion 26. It is preferable that a total size or area of the joined portions 261 is about 90% or less, preferably about 80% or less, or about 70% or less, of the entire size or area of the surface of the pressure receiving plate 25 facing the damper film 22, for example. It is preferable that a size or area of the non-joined portion 269 is about 10% or greater, preferably about 20% or greater, or about 30% or greater, of the entire size or area of the surface of the pressure receiving plate 25 facing the damper film 22, for example.

Figure 6:
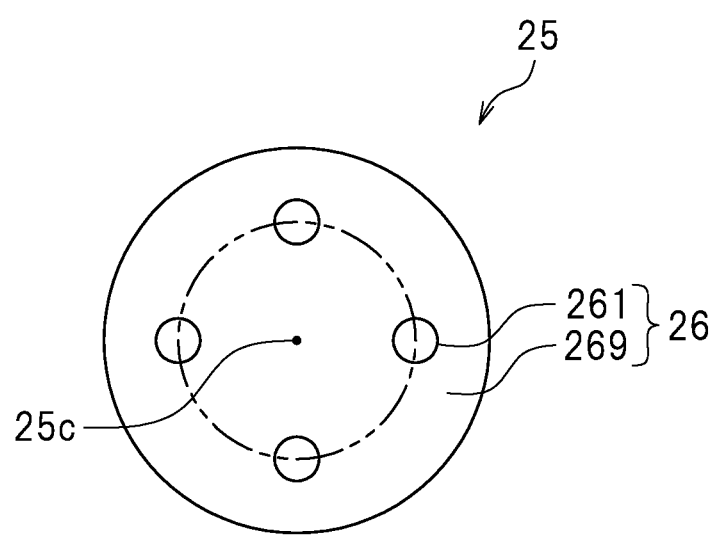
FIG. 6 shows a pressure receiving plate of the damper device shown in FIG. 4.

FIG. 6 shows the pressure receiving plate 25 of the damper device 14 shown in FIG. 4. The surface of the pressure receiving plate 25 that faces the damper film 22 includes the discontinuously joined portion 26. The discontinuously joined portion 26 preferably includes four joined portions 261, for example. The four joined portions 261 are preferably all point-connections, for example. The four joined portions 261 are preferably located along an outer periphery or circumference (represented by the two-dot chain line in FIG. 6) that is centered around a center 25c of the pressure receiving plate 25 and is preferably slightly smaller than the outer profile of the pressure receiving plate 25. The four joined portions 261 are preferably located on the same circumference as each other. The opening of the case main body 21 and the damper film 22 are preferably quadrangular or substantially quadrangular (specifically, rectangular or substantially rectangular), for example. The distances from the apexes of the opening of the case main body 21 and the damper film 22 to the point-connected joined portions 261 closest to the respective apexes are equal or substantially equal to each other.

The discontinuously joined portion 26 in this preferred embodiment preferably includes the four point-connected joined portions 261, for example. The discontinuously joined portion 26 is not limited to including four point-connected joined portions 261. The discontinuously joined portion 26 may include one joined portion 261, or may include a plurality of joined portions 261, for example, two or more, three or more, four or more, or five or more joined portions 261, for example. The joined portions 261 may be arranged regularly at the surface of the pressure receiving plate 25 at a predetermined pitch or may be arranged irregularly. Instead of being point-connected (dot-shaped), the joined portions 261 may be linear, for example, straight line-shaped, bow-shaped, wave-shaped or the like, or may have a pattern, for example, a circular pattern, a polygonal pattern, a pattern of an alphabetical character, a gear pattern or the like.

The locations of the joined portions 261 and the non-joined portions 269 of the discontinuously joined portion 26 may be preferably determined in consideration of, for example, the shape of the damper film 22, the opening of the case main body 21 or the like. In an example, the joined portions 261 are located such that distances from the contour of the damper film 22 and/or the opening of the case main body 21 to the center of the pressure receiving plate 25 are equal or substantially equal to each other. In the case where, for example, the damper film 22 and/or the opening of the case main body 21 is polygonal as shown in FIG. 4, the joined portions 261 may be preferably located such that distances from the apexes of the polygon to the center of the pressure receiving plate 25 are equal or substantially equal to each other.

In the case where the damper film 22 and/or the opening of the case main body 21 has a rotationally symmetrical shape, for example, in case where the damper film 22 and/or the opening of the case main body 21 is polygonal as shown in FIG. 4, the joined portions 261 may also be preferably located to be rotationally symmetrical centered around the center 25c of the pressure receiving plate 25. For example, the joined portions 261 may be preferably located at equal or substantially equal intervals on the same circumference centered around the center 25c of the pressure receiving plate 25. Alternatively, the joined portions 261 may be preferably radially centered around the center 25c of the pressure receiving plate 25. With such a structure, the flexible deformation of the damper film 22 is transmitted uniformly or substantially uniformly to the pressure receiving plate 25, and thus the pressure receiving plate 25 is displaced reliably and accurately. Therefore, the detection precision of the amount of the stored ink is increased.

In the case where, for example, the opening of the case main body 21 and/or the damper film 22 is polygonal, for example, triangular, quadrangular, pentagonal, hexagonal or the like, it may be preferable that the number n of the joined portions 261 is a divisor of the number of the apexes (it should be noted that preferably n≥3). In the case where the opening of the case main body 21 and/or the damper film 22 is quadrangular as shown in FIG. 4, the number n of the joined portions 261 may be preferably 4, for example. In the case where the opening of the case main body 21 is hexagonal, the number n of the joined portions 261 may be preferably 3 or 6, for example. It is especially preferable that the number n of the joined portions 261 is equal to the number of the apexes of the polygon, for example. In the case where the discontinuously joined portion 26 includes the joined portions 261 that are provided in the number fulfilling the above-described condition and are located to be rotationally symmetrical and the remaining portion of the discontinuously joined portion 26 is the non-joined portion 269, the flexible deformation of the damper film 22 is accurately and reliably reflected in the displacement of the pressure receiving plate 25.

Figure 7A:
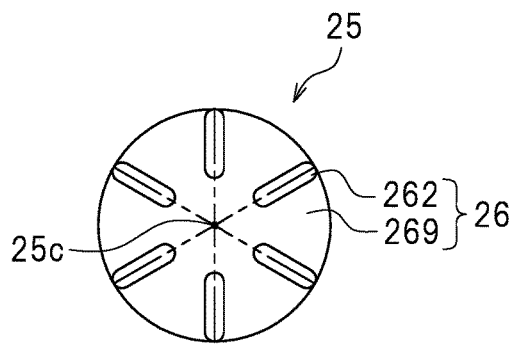
FIG. 7A shows another example of the pressure receiving plate.
Figure 7B:
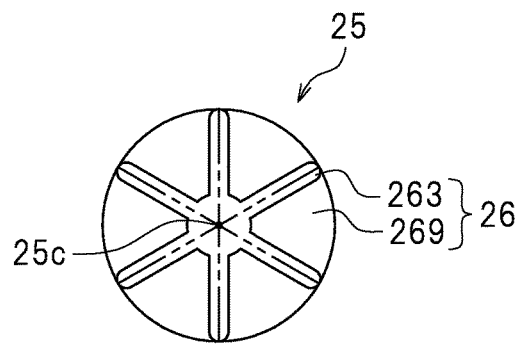
FIG. 7B shows still another example of the pressure receiving plate.
Figure 7C:
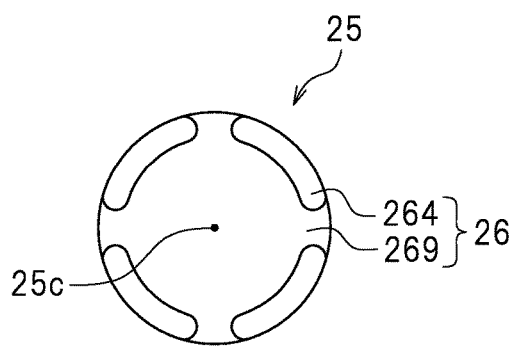
FIG. 7C shows still another example of the pressure receiving plate.
Figure 7D:
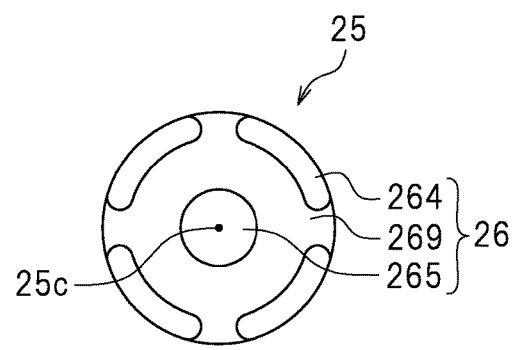
FIG. 7D shows still another example of the pressure receiving plate.
Figure 7E:
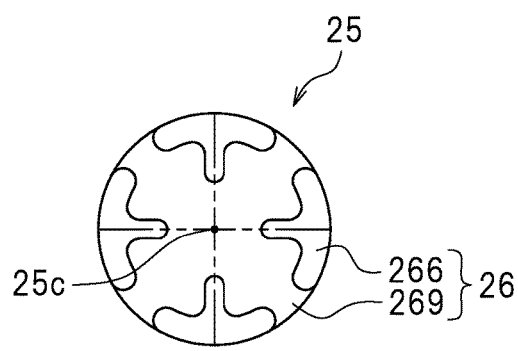
FIG. 7E shows still another example of the pressure receiving plate.

FIG. 7A through FIG. 7E show other examples of the pressure receiving plate 25. In these preferred embodiments, the surface of the pressure receiving plate 25 facing the damper film 22 includes joined portions that preferably are linear or have a two-dimensional pattern, for example. In FIG. 7A, six linear joined portions 262 are radially centered around the center 25c of the pressure receiving plate 25. In FIG. 7B, six linear joined portions arranged radially and a circular joined portion located in a central portion of the pressure receiving plate 25 are combined together to define one gear-shaped joined portion 263. In FIG. 7C, four bow-shaped joined portions 264 are arranged at equal or substantially equal intervals along a circumference centered around the center 25c of the pressure receiving plate 25. The four bow-shaped joined portions 264 are located on the same circumference as each other. In FIG. 7D, the four bow-shaped joined portions 264 are located at equal or substantially equal intervals on the same circumference as each other, and one circular joined portion 265 is located in a central portion of the pressure receiving plate 25. In FIG. 7E, four linear joined portions radially located, and four bow-shaped joined portions located at equal or substantially equal intervals on the same circumference, respectively overlap each other to define four T-shaped joined portions 266. In each of FIG. 7A through FIG. 7E, a portion other than the joined portion(s) 262, 263, 264, 265 or 266 is the non-joined portion 269. The discontinuously joined portion 26 has such a structure.

The detection lever 27 is located outside of the ink storage chamber 23. The detection lever 27 is an ink storage amount detection device that detects the amount of the stored ink based on the degree of the flexible deformation (positional change) of the damper film 22. As shown in FIG. 4, the detection lever 27 is secured to the wall of the case main body 21 preferably by two securing portions 27b, for example. The detection lever 27 is coupled with the center 25c of the pressure receiving plate 25 via the damper film 22. The detection lever 27 is located so as to movable closer to, or farther from, the ink storage chamber 23 by a spring 27c, and is always in contact with the damper film 22. The detection lever 27 is displaced based on the flexible deformation of the damper film 22.

When, for example, the amount of the ink stored in the ink storage chamber 23 is decreased to be small, the damper film 22 is flexibly deformed by a predetermined amount internally toward the ink storage chamber 23. Along with the flexible deformation of the damper film 22, the detection lever 27 is also displaced by a predetermined amount toward the ink storage chamber 23. In contrast, when the ink is supplied to the ink storage chamber 23 and the amount thereof is increased, the damper film 22 is flexibly deformed by a predetermined amount externally away from the ink storage chamber 23. Along with the flexible deformation of the damper film 22, the detection lever 27 is also displaced by a predetermined amount away from the ink storage chamber 23. Therefore, based on the information on the displacement of the detection lever 27, it is determined whether or not the amount of the ink in the ink storage chamber 23 is within a predetermined range. For example, it is determined whether or not the amount of the ink in the ink storage chamber 23 has reached the predetermined lower limit and/or whether or not the amount of the ink in the ink storage chamber 23 has reached the predetermined upper limit (whether or not the ink storage chamber 23 has become full).

Based on the displacement of the detection lever 27, a signal is transmitted to the controller 18. Upon receipt of the signal, the controller 18 drives or stops the liquid transmission pump 13. With the above-described structure, the liquid transmission pump 13 is actuated in accordance with the amount of the ink stored in the damper device 14. This allows the amount of the ink in the ink storage chamber 23 to be maintained at a predetermined level, and thus the ink is supplied to the ink injection head 15 accurately and reliably.

As shown in FIG. 5, in this preferred embodiment, the detection lever 27 is coupled with the center 25c of the pressure receiving plate 25. The detection lever 27 includes a protrusion 27a at a position at which the detection lever 27 is coupled with the pressure receiving plate 25. The pressure receiving plate 25 is preferably provided with a recess 25a at the center 25c, at which the pressure receiving plate 25 is coupled with the protrusion 27a. The recess 25a is recessed internally into the ink storage chamber 23 such that a tip of the detection lever 27 on the side of the ink storage chamber 23 (i.e., the protrusion 27a) is able to be inserted into the recess 25a. This allows the detection lever 27 and the pressure receiving plate 25 to be coupled to each other stably and reliably. Therefore, the degree of the flexible deformation of the damper film 22 is transmitted to the detection lever 27 with high precision, and the detection lever 27 is movable stably and reliably.

While the printing is not performed, namely, while the ink is not injected from the ink injection head 15, the ink of an amount exceeding a predetermined amount is stored in the ink storage chamber 23 of the damper device 14. In this state, the damper film 22 is flexibly deformed externally away from the ink storage chamber 23 by the spring force of the tapered spring 24. This maintains the inside of the ink storage chamber 23 in a negative pressure state, and also maintains the lower surface 15a, of the ink injection head 15 in communication with the ink storage chamber 23, to receive a negative pressure. Therefore, ink leakage from the nozzles of the ink injection head 15 is prevented.

The ink is circulated in the ink supply system as follows. First, a cap 19 is attached to the lower surface 15a of the ink injection head 15. Next, the controller 18 opens the second connection opening 172 and the third connection opening 173 of the three-way valve 17 and closes the first connection opening 171. Namely, the three-way valve 17 switches the connection openings 171, 172 and 173 to realize a state where the second connection opening 172 and the third connection opening 173 are in communication with each other. In this state, the liquid transmission pump 13 is driven. Then, the ink flows in the ink circulation path 16 from the damper device 14 toward the three-way valve 17. The ink which has passed the ink circulation path 16 passes the ink supply path 12 to flow toward the damper device 14. In FIG. 3, the arrows represent the direction of flow of the ink during the ink circulation. The ink is circulated in the ink supply system in this manner and thus is maintained with a uniform quality or substantially uniform quality. As a result, a solid content in the ink (e.g., coloring material) is reliably prevented from being separated or precipitated. In addition, the ink is prevented from being wasted.

In the meantime, during the printing, the ink is injected toward the recording paper sheet 5 from the ink injection head 15. During the printing, the controller 18 opens the first connection opening 171 and the second connection opening 172 of the three-way valve 17 and closes the third connection opening 173. Namely, the three-way valve 17 switches the connection openings 171, 172 and 173 to realize a state where the first connection opening 171 and the second connection opening 172 are in communication with each other. When the ink is injected from the nozzles, the ink stored in the ink storage chamber 23 of the damper device 14 is absorbed and supplied to the ink injection head 15. This decreases the amount of the ink in the ink storage chamber 23 to generate a negative pressure state in the ink storage chamber 23. As the pressure in the ink storage chamber 23 is decreased, the damper film 22 is flexibly deformed internally toward the ink storage chamber 23. Along with the flexible deformation of the damper film 22, the pressure receiving plate 25 discontinuously joined with the damper film 22 is also displaced. This displacement is transmitted, with high precision, to the detection lever 27 coupled with the pressure receiving plate 25. Information on the displacement of the detection lever 27 is transmitted to the controller 18. When the displacement of the detection lever 27 reaches a predetermined level, the controller 18 determines that the amount of the ink stored in the ink storage chamber 23 has reached the predetermined lower limit and drives the liquid transmission pump 13. As a result, the ink is transmitted from the ink cartridge 11C toward the damper device 14.

As the ink flows into the ink storage chamber 23 of the damper device 14, the negative pressure state in the ink storage chamber 23 is cancelled. At the same time, the flexible deformation of the damper film 22 is alleviated to displace the pressure receiving plate 25 discontinuously joined with the damper film 22. This displacement is transmitted, with high precision, to the detection lever 27 coupled with the pressure receiving plate 25. When the displacement of the detection lever 27 reaches a predetermined level, the controller 18 determines that the amount of the ink stored in the ink storage chamber 23 has reached the predetermined upper limit (that the ink storage chamber 23 has become full) and stops the liquid transmission pump 13. In this manner, the liquid transmission pump 13 is driven based on the displacement of the detection lever 27, and thus the amount of the ink in ink storage chamber 23 is maintained at the predetermined level. This prevents the inside of the ink storage chamber 23 to have an excessively negative pressure state, and thus the ink is supplied from the ink cartridge 11C to the ink injection head 15 accurately and reliably. Therefore, during the printing, the ink is injected from the ink injection head 15 accurately and reliably.

As described above, as shown in FIG. 4 and FIG. 6, in the damper device 14 in this preferred embodiment, the pressure receiving plate 25 and the damper film 22 are joined together discontinuously, not along the entire surface thereof. With such a structure, the pressure receiving area of the pressure receiving plate 25 (the size of the area of the pressure receiving plate 25 in contact with the damper film 22) is made large while the movable area of the damper film 22 is maintained. The discontinuous joining prevents the air from being confined easily at the joining surface of the damper film 22 and the pressure receiving plate 25. Therefore, the pressure fluctuation in the ink storage chamber 23 is reflected in the flexible deformation of the damper film 22 with high precision. The flexible deformation of the damper film 22 is transmitted to the pressure receiving plate 25. Therefore, the detection lever 27 is displaced accurately and reliably, and thus the amount of the ink stored in the ink storage chamber 23 is detected with high precision. For these reasons, the ink supply system including the damper device 14, or the printer 10 including the ink supply system, has an increased level of stability of the ink injection, and thus allows the ink to be injected accurately and reliably from the ink injection head 15.

In this preferred embodiment, the discontinuously joined portion 26 includes the joined portions 261 joined with the damper film 22 and the non-joined portion 269 not joined with the damper film 22. At least a portion of the non-joined portion 269 is located closer to the center of the pressure receiving plate 25 than the joined portions 261. The non-joined portion 269 is not closed by the joined portions 261. This allows the air bubbles to be better discharged from the discontinuously joined portion 26.

In this preferred embodiment, the discontinuously joined portion 26 includes the joined portions 261 preferably provided in a number equal to the number of the apexes of the polygonal shape of the damper film 22. With such a structure, the distances from the apexes of the damper film 22 to the joined portions 261 closest to the respective apexes are equal or substantially equal to each other. The joined portions 261 included in the discontinuously joined portion 26 are preferably rotationally symmetrical and centered around the center 25c of the pressure receiving plate 25. In more detail, the joined portions 261 are located at equal or substantially equal intervals on the same circumference centered around the center 25c of the pressure receiving plate 25. In another preferred embodiment, as shown in FIG. 7A and FIG. 7B, the joined portions 262 or 263 included in the discontinuously joined portion 26 are located radially and centered around the center 25c of the pressure receiving plate 25. In each of these preferred embodiments of the present invention, the flexible deformation of the damper film 22 is transmitted to the pressure receiving plate 25 and further to the detection lever 27 more stably and reliably. Therefore, the amount of the ink stored in the ink storage chamber 23 is detected with higher precision.

In this preferred embodiment, the tapered spring 24 is used as an elastic member that presses the damper film 22 externally away from the ink storage chamber 23. In the state of being compressed, the tapered spring 24 is significantly shorter in a direction in which the tapered spring 24 is extended or contracted, as compared with, for example, a coil spring. For this reason, the use of the tapered spring 24 allows the distance between the damper film 22 and the wall 21a of the case main body 21 to be shorter. Therefore, the degree of freedom of the outer shape of the damper device 14 is increased. In addition, the joining of the damper film 22 and the pressure receiving plate 25 is performed easily and highly precisely. This is preferable from the point of view of the ease of production and the production efficiency.

In this preferred embodiment, the detection lever 27 is located so as to be coupled with the center 25c of the pressure receiving plate 25. As compared with the case where the detection lever 27 is coupled with the entire or substantially the entire surface of the pressure receiving plate 25 or with a portion of the pressure receiving plate 25 other than the center 25c, the flexible deformation of the damper film 22 is transmitted to the detection lever 27 with higher precision. The detection lever 27 includes the protrusion 27a at a position where the detection lever 27 is coupled with the pressure receiving plate 25. The pressure receiving plate 25 is provided with the recess 25a at the center 25c such that the protrusion 27a of the detection lever 27 is inserted into the recess 25a. These elements allow the pressure receiving plate 25 and the detection lever 27 to be coupled with each other more stably and reliably. Therefore, the amount of the ink stored in the ink storage chamber 23 is detected with higher precision.

In this preferred embodiment, as shown in FIG. 3, the ink supply system includes the ink circulation path 16 that communicates the ink supply path 12 and the damper device 14 to each other. The ink preferably is a mixture of a solvent and a solid content (e.g., coloring material). The ink is circulated and thus is maintained at a uniform quality. Therefore, the solid content is highly prevented from being separated or precipitated.

In this preferred embodiment, as shown in FIG. 4, the inner diameter d of the ink circulation outlet 29b of the damper device 14 is smaller than the inner diameter D of the ink inlet 20 of the damper device 14. In general, there is a tendency that as the inner diameter of an ink flow path is larger, the dynamic pressure fluctuation is larger. Therefore, the inner diameter d of the ink circulation outlet 29b, which does not directly contribute to the supply of the ink, is made smaller, and thus the dynamic pressure fluctuation derived from the ink on the circulation side is significantly reduced or prevented. In this manner, the stable supply of the ink and the reduction or prevention of the dynamic pressure fluctuation are provided in a highly balanced and reliable manner.

In this preferred embodiment, as shown in FIG. 4, the lower end of the ink circulation outlet 29b of the damper device 14 is located below the lower end of the ink inlet 20 of the damper device 14 in the direction of gravity. With this structure, while the predetermined amount of the ink is stored in the ink storage chamber 23, the lower end of the ink circulation outlet 29b is located in the ink more easily. As a result, the air bubbles do not flow easily into the ink circulation path 16, and thus a fault such as a printing defect or the like is highly prevented.

Preferred embodiments of the present invention are described above. The above-described preferred embodiments are merely examples, and the present invention may be carried out in any of various other preferred embodiments.

For example, in each of the above-described preferred embodiments, the liquid stored in the liquid supplies (ink cartridges 11) preferably is ink. The liquid is not limited to ink. The liquid may be, for example, a washing liquid or the like usable for maintenance of the printer 10.

In the above-described preferred embodiments, the elastic member that flexibly deforms the damper film 22 externally away from the ink storage chamber 23 preferably is the tapered spring 24. The elastic member is not limited to a tapered spring. The elastic member may be, for example, a leaf spring, a coil spring, a rubber member (e.g., rubber sheet) or the like.

In the above-described preferred embodiments, the inkjet recording device preferably is the inkjet printer 10. The inkjet recording device is not limited to an inkjet printer. The inkjet recording device may be any device capable of recording an image. The ink supply systems of the inkjet printer 10 described above each preferably include the ink cartridge (liquid supply) 11, the ink supply path (liquid supply path) 12, the liquid transmission pump 13, the damper device 14, the ink injection head (liquid injector) 15, the ink circulation path 16, and the controller 18. The ink supply systems of the inkjet printer 10 are not limited to including these elements. For example, the liquid transmission pump 13 or the ink circulation path 16 may be provided when necessary.

In the above-described preferred embodiments, the damper device 14 is preferably included in the inkjet recording device. The damper device 14 is not limited to being included in an inkjet recording device. The damper device 14 is usable in various devices including a liquid supply system, for example, in various production devices adopting an inkjet system, and measuring devices such as a micropipette and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A liquid supply system, comprising:
a liquid supply that supplies a liquid;
a liquid injector that injects the liquid;
a liquid supply path that communicates the liquid supply and the liquid injector to each other;
a damper located on the liquid supply path to supply the liquid to the liquid injector; and
a liquid circulation path including an end in communication with the liquid supply path and another end in communication with the damper device; wherein
the damper includes:
a liquid storage chamber;
an inlet that is in communication with the liquid storage chamber, and allows the liquid to flow into the liquid storage chamber;
an outlet that is in communication with the liquid storage chamber, and allows the liquid to flow out of the liquid storage chamber; and
a circulation outlet through which the liquid flows out to the liquid circulation path;
a lower end of the circulation outlet is located at a height lower than an end of the inlet; and
the inlet and the circulation outlet are both provided at an upper wall of the liquid storage chamber.

2. The liquid supply system according to claim 1, wherein a lower end of the circulation outlet is located at a position lower than a central portion of a pressure receiving plate.

3. The liquid supply system according to claim 1, wherein an upper end of the circulation outlet is located at a height lower than an upper end of the inlet.

4. The liquid supply system according to claim 1, wherein the circulation outlet has an inner diameter smaller than an inner diameter of the inlet.

5. An inkjet recording device comprising:
a main printer body; and
the liquid supply system according to claim 1.

6. A liquid supply system, comprising:
a liquid supply that supplies a liquid;
a liquid injector that injects the liquid;
a liquid supply path that communicates the liquid supply and the liquid injector to each other;
a damper located on the liquid supply path to supply the liquid to the liquid injector; and
a liquid circulation path including an end in communication with the liquid supply path and another end in communication with the damper device; wherein
the damper includes:
a liquid storage chamber;
an inlet that is in communication with the liquid storage chamber, and allows the liquid to flow into the liquid storage chamber;
an outlet that is in communication with the liquid storage chamber, and allows the liquid to flow out of the liquid storage chamber; and
a circulation outlet through which the liquid flows out to the liquid circulation path;
a lower end of the circulation outlet is located at a height lower than an end of the inlet; and
the inlet and the outlet are both located on an interior of the damper.

* * * * *